(No Model.) 2 Sheets—Sheet 1.
W. KLAGES.
BICYCLE SUPPORT.
No. 497,798. Patented May 23, 1893.
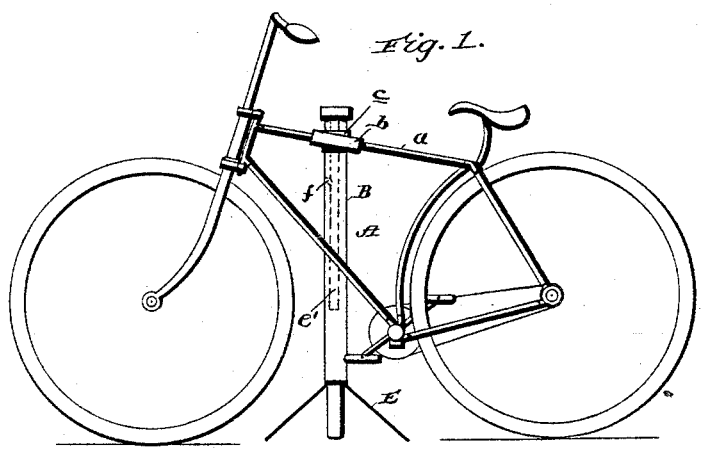
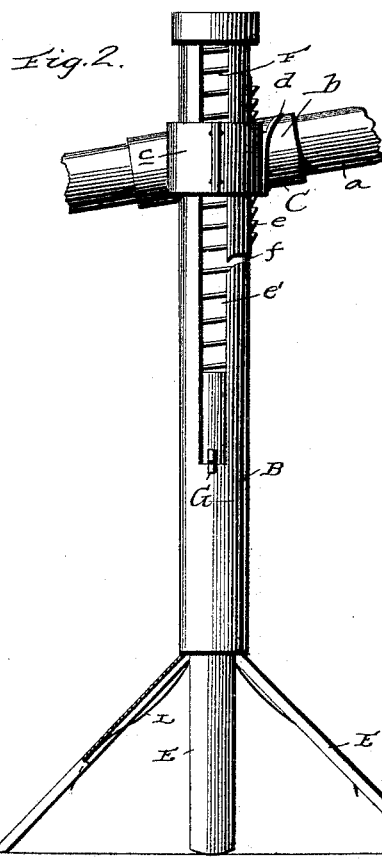
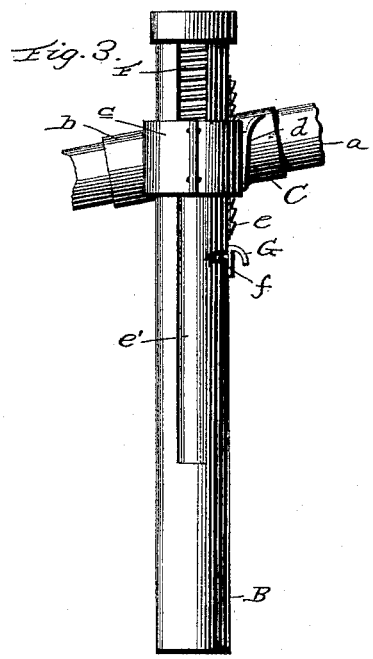
Witnesses:
C. H. Raeder
W. F. Matthews
Inventor
William Klages.
By James J. Sheehy
Attorney (No Model.) 2 Sheets—Sheet 2.
W. KLAGES.
BICYCLE SUPPORT.
No. 497,798. Patented May 23, 1893.
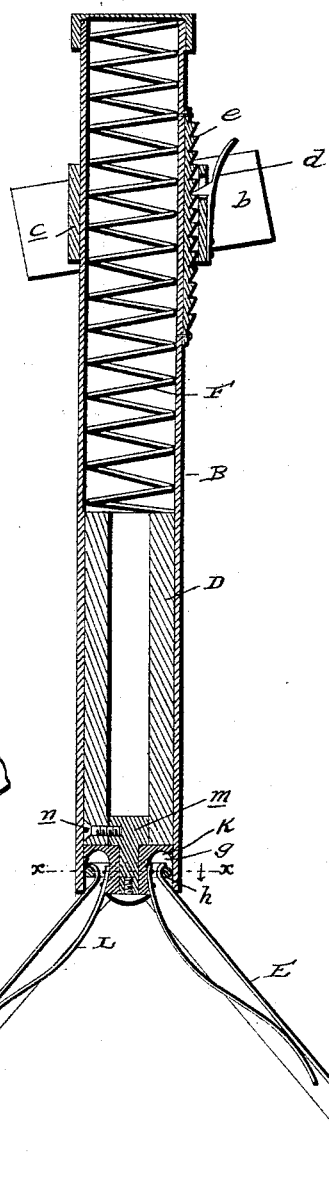
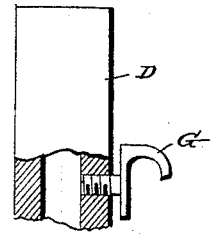
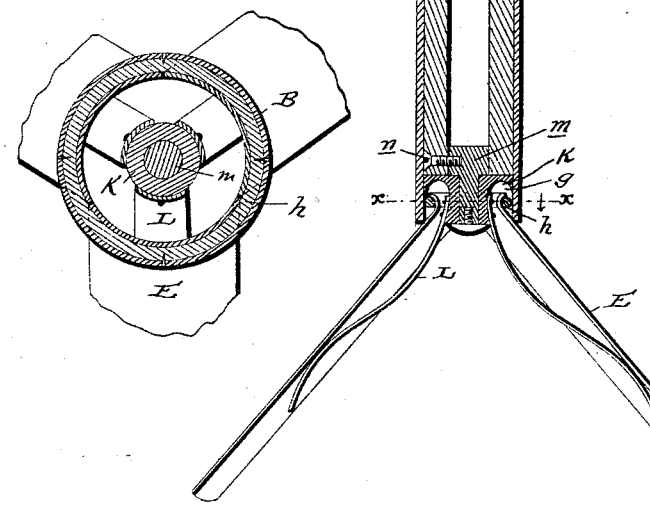
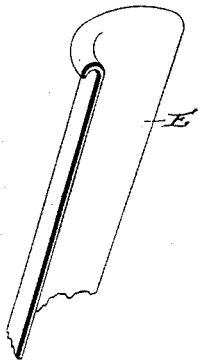
Witnesses:
C. H. Raeder
N. F. Matthews
Inventor
William Klages
By James J. Sheehy
Attorney

UNITED STATES PATENT OFFICE.

WILLIAM KLAGES, OF AKRON, OHIO.

BICYCLE-SUPPORT.

SPECIFICATION forming part of Letters Patent No. 497,798, dated May 23, 1893.

Application filed November 14, 1892. Serial No. 451,932. (No model.)

*To all whom it may concern:*

Be it known that I, WILLIAM KLAGES, a citizen of the United States, residing at Akron, in the county of Summit and State of Ohio, have invented certain new and useful Improvements in Bicycle-Supports; and I do declare the following to be a full, clear, and exact description of the invention, such as will enable others skilled in the art to which it appertains to make and use the same.

My invention has relation to improvements in bicycle supports, and it has for its general object to provide a support of a compact, simple and light construction designed to be readily attached to a bicycle frame and form a permanent part of the same, and one adapted to be readily adjusted and adjustably fixed so as not to come in contact with the ground or interfere with the movements of the rider while the bicycle is in motion.

A further object of the invention is to provide a support adapted to be readily adjusted to suit bicycles of various sizes.

Other objects and advantages will be fully understood from the following description and claims when taken in connection with the accompanying drawings in which—

Figure 1, is a side elevation of a bicycle provided with one of my improved supports. Fig. 2, is an enlarged elevation, illustrating the support with its legs extended so as to engage the ground. Fig. 3, is a similar view of the support with the legs drawn up into the tubular body. Fig. 4, is a vertical diametrical section of the support with the legs in their extended positions. Fig. 5, is an enlarged, detail horizontal section, taken in the plane indicated by the line $x, x$, of Fig. 4. Fig. 6, is a detail elevation, partly in section, illustrating a portion of the plunger and the thumb piece for manipulating the same, and Fig. 7, is a detail perspective view of the upper portion of one of the legs.

In the said drawings similar letters designate corresponding parts throughout the several views referring to which—

A, indicates the frame of a bicycle, which may be of any ordinary or approved construction, and B, indicates the tubular body of my improved support. This tubular body B, may be attached to any suitable part of the bicycle frame in any approved manner, but I prefer in practice to connect it to one of the frame bars $a$, through the medium of a double clip C, as by the employment of the said clip the support may be readily disconnected from the bicycle frame, when desired.

The double clip C, as better shown in Figs. 2, and 3, comprises a section $b$, designed to embrace the brace bar $a$, and the section $c$, which is disposed approximately at right angles to the section $b$, and is designed to loosely receive the tubular body B, of the support. This section $c$, of the clip, carries a latch $d$, which is designed to engage the rack teeth $e$, with which the body B, is provided, whereby it will be seen that the said body may be readily adjusted with respect to the bar $a$, of the machine frame when desired.

By the provision of the latch $d$, in connection with the rack teeth $e$, of the body B, it will be further seen that the said body may be readily adjusted and adjustably fixed so as to adapt it to hold bicycles of various sizes in an upright position.

Arranged and adapted to move in the tubular body B, of the support is the vertical plunger D, which carries the feet E, and is backed by the coiled spring F, through the medium of which it is moved downwardly, when released as presently described, so as to push the feet E, out of the tubular body and enable said feet to assume their operative positions as shown in Fig. 4. This vertical plunger D, is returned to its normal position and is held in such position, through the medium of the thumb piece G, which extends through and is designed to move in the vertical slot $e'$, of the body B, and is adapted to take into the off-set $f$, leading from the slot $e'$, as better shown in Fig. 3. By this construction it will be seen that when a rider desires to mount his machine, it is simply necessary to move the thumb piece G, up the slot $e'$, and then turn said thumb piece into the offset $f$, when the legs E, will be drawn upwardly into the tubular body B, so as not to engage the ground or otherwise interfere with the movement of the machine.

Carried at the lower end of the plunger D, as better shown in Fig. 4, is a disk K, which is provided in its under side with a circular recess $g$, designed to afford play space for the upper ends of the legs E, which are pivotally connected to a ring $h$, carried by the disk and arranged in the recess $g$, as shown. The legs E, as better shown in Fig. 7, are preferably of such a form in cross section, that when they are drawn up into the tubular body B, and brought edge to edge, they will form a tube concentric with the said tubular body, for a purpose presently set forth.

As better shown in Fig. 4, of the drawings, the disk K, is mounted and secured upon a stud $m$, which extends up into the bore of the plunger, and is held in position by a screw as $n$, whereby it will be seen that the disk may be readily disconnected from the plunger when desired.

Connected to the disk K, and bearing against the inner sides of the legs E, are springs L, which are designed and adapted to throw said legs outwardly into their operative positions when they are extended from the lower ends of the tubular body.

By reason of the legs E, being of the peculiar form in cross section as described, it will be seen that when they are drawn up into the tubular body B, they will form a receptacle for the springs L, whereby said springs will be prevented from interfering with the adjustment of the plunger.

By having the legs E, of my improved support connected to the plunger D, through the medium of the detachable disk K, as described, it will be seen that the said legs may be readily removed from the support when broken or otherwise impaired and may be replaced by other legs without disturbing the other parts of the support. I do not desire, however to be understood as confining myself to the manner described of connecting the legs E, as they might if desired be connected directly to the plunger or to any suitable device carried by the plunger.

It will be seen from the foregoing description that my improved support is very light and compact and consequently does not add materially to the weight or size of a bicycle; that it may be readily attached to a machine and as readily removed therefrom, and that it may be readily adjusted, after use, so as not to interfere with the movements of the bicycle while the same is in motion, which is a highly important desideratum.

It is obvious to those skilled in the art, that many changes or modifications may be made in the construction and relative arrangement of the elements making up my improved support, and I therefore do not desire to be confined to the precise construction and relative arrangement herein disclosed.

Having described my invention, what I claim is—

1. In a bicycle support, the combination of a tubular body, a movable piece or plunger arranged in the tubular body, legs pivotally connected with the plunger, and springs engaging the legs and adapted to cause the same to assume an extended position, substantially as and for the purpose set forth.

2. In a bicycle support, the combination with a tubular body, of the movable plunger arranged and adapted to move in the body, a spring backing said plunger, legs pivotally connected to the lower end of the plunger, and springs arranged upon the inner sides of the legs and adapted to throw said legs outward when they are extended from the tubular body, substantially as specified.

3. In a bicycle support, the combination with the tubular body having the vertical slot and the offset leading from said slot; of the plunger arranged and adapted to move in the tubular body and having a thumb piece adapted to move in the vertical slot and engage the offset, legs pivotally connected to the plunger and a spring backing said plunger, springs arranged upon the inside of the legs and adapted to throw the same outwardly, substantially as specified.

4. In a bicycle support, the combination with a tubular body and a plunger arranged and adapted to move in said body; of the legs of a curvilinear form in cross section pivotally connected to a ring carried by the plunger, and springs carried by the plunger and engaging the inner sides of the legs, substantially as specified.

In testimony whereof I affix my signature in presence of two witnesses.

WILLIAM KLAGES.

Witnesses:
  AUG. BLISSMAN,
  A. B. TINKER.